US009537962B2

(12) United States Patent
Lin et al.

(10) Patent No.: US 9,537,962 B2
(45) Date of Patent: Jan. 3, 2017

(54) METHOD, DEVICE AND SYSTEM FOR PROCESSING CLIENT ENVIRONMENT DATA

(71) Applicant: Tencent Technology (Shenzhen) Company Limited, Shenzhen (CN)

(72) Inventors: Li Lin, Shenzhen (CN); Hua Kou, Shenzhen (CN); Shuai Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 385 days.

(21) Appl. No.: 14/148,586

(22) Filed: Jan. 6, 2014

(65) Prior Publication Data
US 2014/0136608 A1 May 15, 2014

Related U.S. Application Data

(63) Continuation of application No. PCT/CN2013/086910, filed on Nov. 12, 2013.

(30) Foreign Application Priority Data

Nov. 15, 2012 (CN) .......................... 2012 1 0459986

(51) Int. Cl.
*H04L 29/08* (2006.01)
*G06F 17/30* (2006.01)
*G06Q 30/02* (2012.01)

(52) U.S. Cl.
CPC ......... *H04L 67/22* (2013.01); *G06F 17/30702* (2013.01); *G06F 17/30867* (2013.01); *G06Q 30/02* (2013.01); *H04L 67/306* (2013.01)

(58) Field of Classification Search
USPC ........................................................ 709/203
See application file for complete search history.

(56) References Cited

U.S. PATENT DOCUMENTS

2011/0320613 A1* 12/2011 Mandal ................ G06Q 10/107
709/227
2012/0281587 A1* 11/2012 Yang ..................... H04W 16/04
370/252

FOREIGN PATENT DOCUMENTS

CN      101242316 A      8/2008
CN      101355504 A      1/2009
(Continued)

OTHER PUBLICATIONS

Tencent Technology, ISRWO, PCT/CN2013/086910, Feb. 27, 2014, 8 pgs.

(Continued)

*Primary Examiner* — Vivek Srivastava
*Assistant Examiner* — Hien Doan
(74) *Attorney, Agent, or Firm* — Morgan, Lewis & Bockius LLP

(57) ABSTRACT

A server system with one or more processors and memory receives respective client environment data from a first client device of a plurality of client devices, where the respective client environment data is provided to the server system according to predetermined collection parameters. The server system determines characteristic criteria for identifying potential target clients for additional data collection based on the respective client environment data received from the first client device. The server system sends a data collection command to at least one second client device of the plurality of client devices in accordance with the characteristic criteria.

20 Claims, 15 Drawing Sheets

(56) References Cited

FOREIGN PATENT DOCUMENTS

CN    101572629 A    11/2009
CN    102238045 A    11/2011

OTHER PUBLICATIONS

Tencent Technology, IPRP, PCT/CN2013/086910, May 19, 2015, 6 pgs.

* cited by examiner

| | | |
|---|---|---|
| bill-2012-04-16-00.dat | 16-Apr-2012 00:59 | 4.1M |
| bill-2012-04-16-01.dat | 16-Apr-2012 01:59 | 2.4M |
| bill-2012-04-16-02.dat | 16-Apr-2012 02:59 | 1.6M |
| bill-2012-04-16-03.dat | 16-Apr-2012 03:59 | 1.2M |
| bill-2012-04-16-04.dat | 16-Apr-2012 04:59 | 903K |
| bill-2012-04-16-05.dat | 16-Apr-2012 05:59 | 899K |
| bill-2012-04-16-06.dat | 16-Apr-2012 06:59 | 1.3M |
| bill-2012-04-16-07.dat | 16-Apr-2012 07:59 | 2.3M |
| bill-2012-04-16-08.dat | 16-Apr-2012 08:59 | 3.4M |
| bill-2012-04-16-09.dat | 16-Apr-2012 09:59 | 4.0M |
| bill-2012-04-16-10.dat | 16-Apr-2012 10:59 | 4.2M |
| bill-2012-04-16-11.dat | 16-Apr-2012 11:59 | 4.7M |
| bill-2012-04-16-12.dat | 16-Apr-2012 12:59 | 6.6M |
| bill-2012-04-16-13.dat | 16-Apr-2012 13:59 | 5.2M |
| bill-2012-04-16-14.dat | 16-Apr-2012 14:59 | 4.5M |
| bill-2012-04-16-15.dat | 16-Apr-2012 15:59 | 4.4M |
| bill-2012-04-16-16.dat | 16-Apr-2012 16:30 | 2.3M |

Figure 3C

| | Quality Data | | | | | | |
|---|---|---|---|---|---|---|---|
| > Weekly Summary | | | | | | | |
| ☑ Number of Restarts | ☐ Upgrade Cancellation | ☐ Crashes | | ☑ Success Rate | | ☐ Upgrade Success | |
| ☐ Upgrade Failure | ☐ No Need For Upgrade | ☑ Upgrade Success Rate | | ☑ Absolute Upgrade Success Rate | | ☐ Average Download Time | |
| ☐ Number of D packages ☐ Number of N packages ☑ Pull-up Index Tree Success ☑ Log-on Success | | | | | | ☐ Successful Pull-up of Game Client Terminal | |
| | 2012-09-10 | 2012-09-09 | 2012-09-08 | 2012-09-07 | 2012-09-06 | 2012-09-05 | 2012-0 |
| Number of Restarts | 8.72W | 50.98W | 76.07W | 52.56W | 19.67W | 17.43W | 18.13W |
| Crash Rate | 0.11% | 0.14% | 0.08% | 0.09% | 0.07% | 0.08% | 0.08% |
| Upgrade Success Rate | 98.79% | 98.79% | 98.1% | 98.02% | 98.26% | 98.42% | 97.9% |
| Absolute Upgrade Success Rate | 97.84% | 97.91% | 97.36% | 97.41% | 97.63% | 97.59% | 97.05% |
| Pull-up index Tree Success | 7.75W | 44.48W | 67.13W | 47.06W | 16.96W | 14.97W | 15.77W |
| Log-on Success | 7.78W | 44.6W | 67.29W | 47.17W | 17W | 15.01W | 15.79W |

Figure 3D

METHOD, DEVICE AND SYSTEM FOR PROCESSING CLIENT ENVIRONMENT DATA

RELATED APPLICATIONS

This application is a continuation application of PCT Patent Application No. PCT/CN2013/086910, entitled "METHOD, DEVICE AND SYSTEM FOR PROCESSING CLIENT ENVIRONMENT DATA" filed Nov. 12, 2013, which claims priority to Chinese Patent Application Serial No. CN201210459986.X, entitled "METHOD, DEVICE, AND SYSTEM FOR PROCESSING CLIENT BEHAVIOR DATA", filed Nov. 15, 2012, both of which are herein incorporated by reference in their entirety.

FIELD OF THE INVENTION

The invention relates to the field of communications technologies, and more particularly to a method, a device and a system for processing client environment data.

BACKGROUND OF THE INVENTION

In recent years, there has been rapid development of Internet technologies, and various products based on Internet technologies have been developed. To better maintain and optimize these products and to provide a better user experience, user behavior data of these products needs to be collected. User behavior data includes reasons for uninstalling a product, the number of successful installations of the product, defects encountered when using the product, the phase in which the defects occur, time spent on pages, the phase in which users exit the product, the defect rate of the product, reasons for crashes of the product, and so on. In this way, market penetration of the product and the product's number active users is known. At the same time, the product's quality is tracked. In addition, user habits, causes for defects or crashes, and influences of the product are also learned.

In the prior art, user behavior data as to a product is typically obtained by conducting questionnaires or surveys of users at critical times (e.g., when the user installs or uninstalls the product), and the information from the questionnaires or surveys is manually analyzed.

Such a method for collecting user behavior data largely relies on user input; therefore, the user behavior data is subjective and uncertain. Not only is the data collection range limited, but, also, the reliability of the collected user behavior data is poor. This greatly affects the accuracy of results obtained from analyzing the user behavior data.

SUMMARY

In order to solve the problems in the prior art, the embodiments of the present invention provide a method and device for collecting and processing client environment data (sometimes also herein called "machine environment data"). The method is performed at a server system (e.g., server system 400, FIGS. 4 and 6-7) with one or more processors and memory. The method includes: receiving respective client environment data from a first client device of a plurality of client devices, where the client environment data is provided to the server system according to predetermined collection parameters. The method also includes determining characteristic criteria for identifying potential target clients for additional data collection based on the respective client environment data received from the first client device. The method further includes sending a data collection command to at least one second client device of the plurality of client devices in accordance with the characteristic criteria.

In some embodiments, a server system (e.g., server system 400, FIGS. 4 and 6-7) includes one or more processors and memory storing one or more programs for execution by the one or more processors, the one or more programs include instructions for performing the operations of the methods described herein. In some embodiments, a non-transitory computer readable storage medium storing one or more programs, the one or more programs comprising instructions, which, when executed by a server system (e.g., server system 400, FIGS. 4 and 6-7) with one or more processors, cause the server system to perform the operations of the methods described herein.

Various advantages of the present invention would be apparent in light of the descriptions below.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

To illustrate the technical solutions according to the embodiments of the invention more clearly, the accompanying drawings for describing the embodiments are introduced briefly in the following. Apparently, the accompanying drawings in the following description are only some embodiments of the invention, and persons skilled in the art can derive other drawings from the accompanying drawings without creative efforts.

FIG. 3C illustrates a representation of stored client environment data in accordance with some embodiments.

FIG. 3D illustrates a user interface for analyzing client environment data in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solutions of the embodiments of the invention are clearly and fully described in the following with reference to the accompanying drawings in the embodiment of the invention. Obviously, the embodiments are only a part rather than all of the embodiments of the invention. All other embodiments obtained by persons skilled in the art based on the embodiments of the invention without creative efforts shall fall within the protection scope of the invention.

The embodiments of the invention provide a method, a device and a system for processing client environment data, which are described in detail below respectively.

Embodiment 1

Figure 1A:
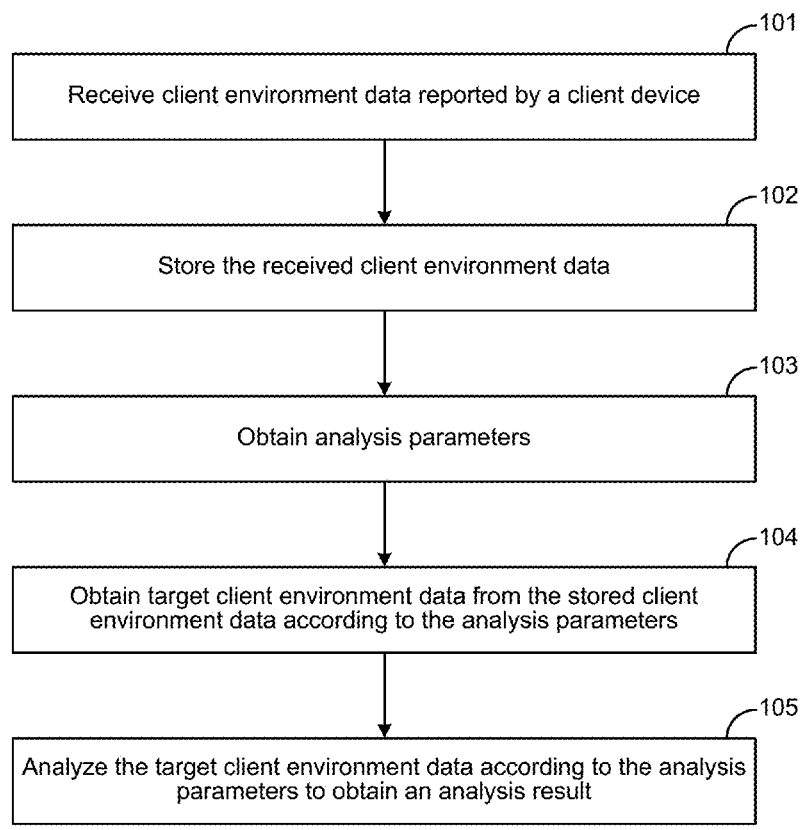
FIG. 1A is a flowchart of a server-side method of processing client environment data in accordance with some embodiments.
Figure 1B:
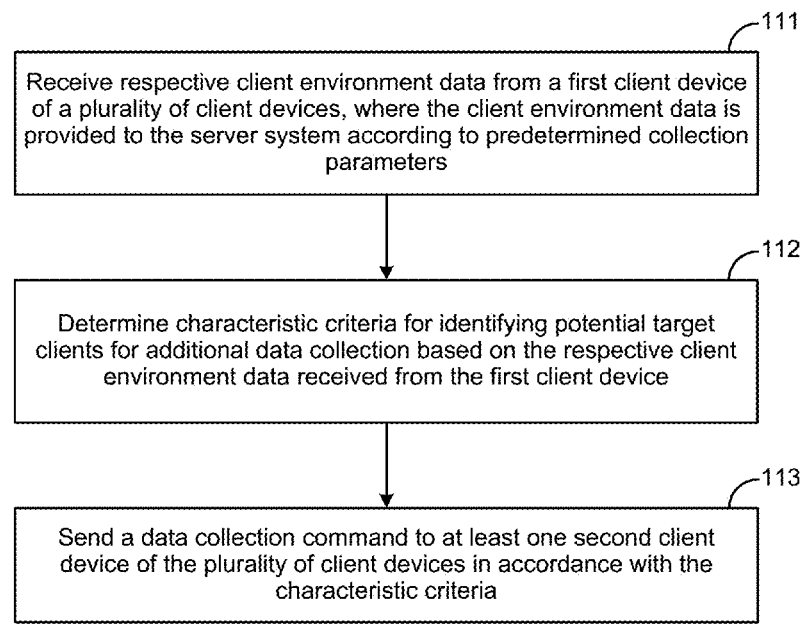
FIG. 1B is a flowchart of a method of collecting client environment data in accordance with some embodiments.

FIGS. 1A-1B show a server-side method of processing client environment data in accordance with some embodiments. In some embodiments, in FIGS. 1A-1B, the method is performed in a server-side environment including at least one server system with one or more processors and memory. In some embodiments, the server-side environment includes two or more servers (e.g., data storage server, analysis server, alarm server, etc.). FIG. 1A is a flowchart diagram of a method of processing client environment data. FIG. 1B is a flowchart diagram of a method of collecting client environment data. In some embodiments, FIG. 1B is an expansion of Step 101 in FIG. 1A.

Attention is directed to FIG. 1A.

As shown in FIG. 1A, Steps 101-105 describe a server-side method of processing client environment data in accordance with some embodiments. In some embodiments, the method of processing client environment data includes: receiving client environment data reported by a client device; obtaining analysis parameters; obtaining target client environment data from the stored client environment data according to the obtained analysis parameters; and analyzing the target client environment data according to the obtained analysis parameters to obtain an analysis result.

The server system receives (101) client environment data reported by a client device. In some embodiments, the client environment data is obtained by the client device by collecting client environment data according to predetermined collection parameters (e.g., including a collection range and a collection time point).

In some embodiments, the type of the client environment data that is to be collected is determined according to the characteristics or current state of the application (e.g., the application is a software product from a developer). For example, in some embodiments, data is collected when a user starts an application (e.g., a game or other application), when a user exits the application, when an error occurs during operation of the application, when data favorable to product analysis is generated during operation of the application, and the like.

In some embodiments, Step 101 is further expanded to include a method of collecting client environment data as shown by Steps 111-113 of FIG. 1B. FIG. 1B is a flowchart diagram of a method of collecting client environment data in accordance with some embodiments.

Attention is directed to FIG. 1B.

In some embodiments, the server system receives (111) respective client environment data from a first client device of a plurality of client devices, where the respective client environment data is provided to the server system according to predetermined collection parameters. In some embodiments, the collection parameters are preprogrammed in an application or in software. Alternatively, in some embodiment, the collection parameters are obtained from the server system, e.g., periodically.

In some embodiments, the collection parameters determine both the type of data to be collected and when the collected data is to be sent to the server system. In some embodiments, the client environment data includes both user behavior data (e.g., user interactions with the application or the client device such as clicks, page views, uninstall, upgrade, gaming behaviors and interactions, etc.) and machine status data (e.g., a software/hardware state of the client device such as crashes, latency, CPU usage, internet protocol (IP) address, network information, etc.). In some embodiments, the predetermined collection parameters include conditional trigger events (e.g., send data whenever client crashes or when latency exceeds a predefined threshold value, and the like) and/or scheduled/periodic trigger events (e.g., send data every minute, 15 minutes or hour, and the like).

As one example, a user associated with the first client device downloads an application from a developer onto the first client device and executes the application. The application includes preprogrammed collection parameters requiring the collection of user behavior data, including the amount of time the user spends on each page or user interface of the application and all user interactions with the application. When the application is closed or when the application is updated to a new version, the preprogrammed collection parameters requires that all client environment data collected since executing the application or since the last update be sent to a server system associated with the developer.

As another example, a user associated with the first client device downloads a game from a developer onto the first client device and executes the game. The game includes preprogrammed collection parameters requiring the collection of user behavior data associated with the user's interaction during game play and also machine status data such as upload/download speed, latency, operating system, game version, network type, IP address, etc. Upon every trigger period (e.g., every thirty seconds or minute, etc.) or whenever the game crashes, the preprogrammed collection parameters also require the game to send all client environment data and machine status data collected since the last trigger period or since execution of the game to a server system associated with the developer.

The server system determines (112) characteristic criteria for identifying potential target clients for additional data collection based on the respective client environment data received from the first client device. In some embodiments, the server system analyzes the client environment data obtained in Step 111 based on an analysis model (e.g., included in analysis parameters received from a system administrator) to generate an analysis result. For example, the analysis result indicates a need to increase bandwidth available to client devices or that a bug has been found in the application. In another example, the analysis result indicates that an issue has been identified based on the client environment data from the first client device but additional client environment data needs to be collected so as to obtain a larger data set to perform further diagnostics in order to solve the identified problem or prove that the identified problem is not a false-positive or isolated event. Sometimes, the analysis result indicates that the issue may be one of several possibilities, and needs additional data on the operating environment (e.g., what other client devices are in communication with the first client device) of the first client device to pin down the real cause of the issue.

In some embodiments, when the analysis result indicates an issue, the server system uses the client environment data obtained in Step 111 to identify characteristic criteria corresponding to the first client device for identifying potential target clients for additional data collection based on the respective client environment data received from the first client device. In some embodiments, the characteristic criteria include a same geographic region, operating system, kernel configuration, game session identifier, network, a sub-network or the like of the first client device.

For example, a first client device executing a multiplayer game sends client environment data (e.g., operating system, kernel configuration, game version, network information, game session identifier, etc.) to the server system in response to the game crashing or latency exceeding a predefined threshold. In this example, based on the client environment data obtained from the first client device, the server system determines that a latency issue exists with the multiplayer game that is being accessed by the first client device and a plurality of other client devices. The server system also determines characteristic criteria for identifying potential target clients for additional data collection based on the client environment data obtained from the first client device. In this example, characteristic criteria include the operating system, kernel configuration, game version, network information, or game session identifier of the first client device. The server system identifies other client devices with the same game session identifier that have a similar operating system, kernel configuration, game version, or network information as the first client device.

The server system sends (113) a data collection command to at least one second client device of the plurality of client devices in accordance with the characteristic criteria. After identifying one or more other client devices in the plurality of client devices with similar characteristic criteria, the server system sends a data collection command to the identified one or more other client devices. The data collection command is an affirmative request for client environment data distinct from the predetermined collection parameters.

In some embodiments, in response to the data collection command, the server system receives client environment data from the at least one second client device. In some embodiments, the server system analyzes the respective client environment data from the first client device and respective client environment data from the at least one second client device to generate a combined analysis result. In some embodiments, the server system runs the same analysis model previously ran on the respective client environment data from the first client device, or, alternatively, a different analysis model specified by the system administrator for running on combined client environment data, to generate the combined analysis result. For example, with the larger data set of client environment data the server system is able to perform further diagnostics to solve the identified problem and/or prove that the identified problem is not a false-positive or isolated event.

In some embodiments, the server system generates one or more suggestions for further data collection or remedial measures based on the combined analysis result. For example, based on the combined analysis result the server system suggests increasing available network bandwidth, requiring clients to upgrade the application, performing additional analysis/diagnostics on the larger data set, changing the format or schema in which the client environment data is stored, etc.

In some embodiments, the server system generates one or more predictions regarding the plurality of client devices based on the combined analysis result. For example, only the first client device is currently affected but the remainder of the plurality of client devices will be similarly effected in X minutes.

In some embodiments, the server system modifies the predetermined collection parameters based on the combined analysis result. For example, the server system pushes an update for the application to the plurality of client devices that modifies or adds trigger events or other parameters to the predetermined collection parameters such as collecting the client environment data specified in the data collection command. In this example, in the future, the predetermined collection parameters will require the plurality of client devices to collect the environment data specified in the data collection command without further data collection commands.

Attention is redirected to FIG. 1A.

The server system stores (102) the received client environment data. In some embodiments, the server system stores client environment data locally or at a remote database. In some embodiments, client environment data for a respective client device is aggregated or the most recent client environment data replaces previously stored client environment data for the respective client device. In some embodiments, client environment data is stored in accordance with a predetermined format or schema. For example, the predetermined format or schema is a format or schema that enables diagnostics or analysis models to be run efficiently. In some embodiments, the predetermined format or schema for storing client environment data is modified according to the requirements of a most frequently run diagnostic or analysis model.

In some embodiments, when the received client environment data is stored, the time of reception for each piece of client environment data is recorded. In addition, an IP address of the client device reporting the client environment data, a data volume of the client environment data and the like are also recorded.

The server system obtains (103) analysis parameters. For example, the analysis parameters may be obtained only when the client environment data needs to be analyzed, or the analysis parameters may be obtained periodically by setting a period, so as to analyze the client environment data according to the obtained analysis parameters.

In some embodiments, the analysis parameters include information such as a time range and an analysis model. The time range refers to a receiving time range of the client environment data to be analyzed. For example, if the time range is "2011-10-10 to 2011-11-10", the server system obtains and analyzes client environment data for which the receiving time is "2011-10-10 to 2011-11-10". The analysis model is a corresponding mathematical model established according to different application characteristics and analysis requirements.

In addition to the time range and the analysis model, the analysis parameters may further include other analysis configuration information. In some embodiments, the analysis parameters include an IP address range of client devices' client environment data to be analyzed. For example, if the IP range is "101.1.1.0 to 101.1.1.1", the device for processing client environment data on the network side will obtain and analyze client environment data reported by client devices whose IP range is "101.1.1.0 to 101.1.1.1".

The server system obtains (104) target client environment data (e.g., client environment data required for the analysis in accordance with the obtained analysis parameters) from the stored client environment data according to the analysis parameters obtained in Step 103.

As a first example, if the receiving time of client environment data is recorded when the received client environment data is stored in Step 102, and the obtained analysis parameters includes a specified time range and analysis model, the step of obtaining target client environment data from the stored client environment data according to the analysis parameters (that is, Step 104) specifically includes: obtaining, from the stored client environment data, client environment data for which the receiving time is within the time range (i.e., the time range indicated in the analysis parameters) as the target client environment data.

As another example, if the IP address of the client devices reporting client environment data is recorded when the received client environment data is stored in Step 102, and the obtained analysis parameters includes an IP address range and analysis model, the step of obtaining target client environment data from the stored client environment data according to the analysis parameters (that is, Step 104) specifically includes: obtaining, from the stored client environment data, client environment data within the IP address range as the target client environment data.

As a further example, if the receiving time of client environment data and the IP address of the client devices reporting the client environment data are recorded when the received client environment data is stored in Step 102, and the obtained analysis parameters includes a time range, IP range and analysis model, the step of obtaining target client environment data from the stored client environment data according to the analysis parameters (that is, step 104) specifically includes: obtaining, from the stored client environment data, client environment data within the time range and the IP range as the target client environment data.

The server system analyzes (105) the target client environment data according to the analysis parameters obtained in Step 103 to obtain an analysis result. In some embodiments, the server system performs the analysis in response to receiving the analysis parameters. In some embodiments, the server system performs the analysis periodically or proactively using previously received analysis parameters.

In some embodiments, this step may be described as follows: The target client environment data obtained in Step 104 is analyzed according to the analysis model in the analysis parameters obtained in Step 103 to obtain the analysis result.

For example, the target client environment data may be classified and statistically analyzed according to the analysis model in the analysis parameters, to obtain the number of starts, the number of failed upgrades, the number of successful upgrades, an upgrade failure rate, an upgrade success rate, the number of cancelled upgrades, the number of successful logins, the number of crashes and/or an average download time and other information of the application corresponding to the target client environment data.

In some embodiments, the server system generates one or more suggestions for further data collection or remedial measures based on the analysis result. In some embodiments, the server system generates one or more predictions regarding the first client device based on the analysis result. In some embodiments, the server system modifies the predetermined collection parameters based on the analysis result.

In some embodiments, in order to feed back the analysis result to relevant personnel (e.g., a system administrator) when the analysis result indicates a defect or problem, the method further includes: sending a notification (e.g., an alert or alarm message) when it is determined that the analysis result exceeds a predetermined alarm level. The alarm level may be set according to characteristics of the application. The notification is sent using one or more communication types such as email, short message, multimedia message, micro message, or the like. The notification message includes one or more types of media such as text, voice, image, etc.

In some embodiments, depending the magnitude by which the analysis result exceeds the predetermined alarm level, and/or the type of the issues involved, the server system sends one of several types of notifications, including notifications indicating that: (A) the server system is automatically undertaking remedial measures which can be aborted by the system administrator (e.g., the notification illustrated in FIG. 3H); (B) the server system will automatically take remedial measures at the after the expiration of a time period from which the notification was sent (e.g., 60 minutes, etc.) unless the system administrator cancels the remedial measures (e.g., the notification illustrated in FIG. 3I); and/or (C) the server system suggests remedial measures but will not undertake the remedial measures until instructed by the system administrator to do so (e.g., the notification illustrated in FIG. 3J).

In addition, to facilitate query of the analysis result by relevant personnel, after the step of analyzing the target client environment data according to the analysis parameters to obtain an analysis result (that is, Step 105), the method may further include: storing the analysis result in an analysis result database for subsequent query and historical analysis.

The structure of the analysis result database may be set according to characteristics of the application. The analysis result database is mainly configured to store an analysis result of client environment data and information related to the client environment data, such as the IP address of the corresponding client device reporting the client environment data and/or the receiving time corresponding to the client environment data.

As can be seen from the above, in this embodiment, client environment data is automatically collected and reported according to predetermined collection parameters, so that a server-side environment can analyze the client environment data to obtain an analysis result. Since the client environment data is automatically collected, and subsequent analysis of the client environment data is performed by a server-side environment, this solution, compared with the prior art which relies on manual user input for collection and manual analysis, achieves real-time collection of client environment data. This solution also greatly improves the reliability of the collected client environment data and, in turn, the accuracy of the analysis result. In addition, since the client environment data does not need to be input and reported by the user, disturbance to the user can be reduced, thereby improving user experience.

Embodiment 2

Figure 2:
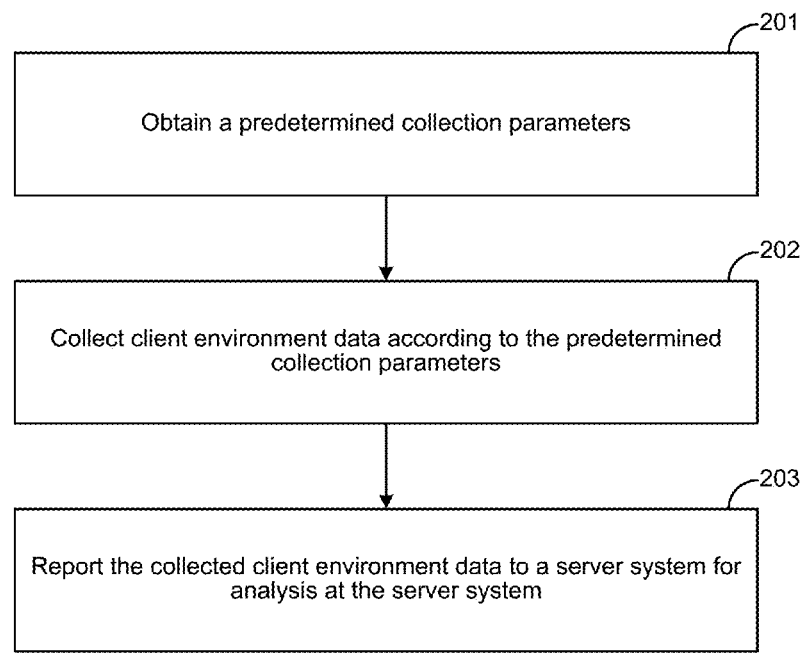
FIG. 2 is a flowchart of a client-side method of processing client environment data in accordance with some embodiments.

FIG. 2 shows a client-side method of processing client environment data. In some embodiments, the method is performed at a client device with one or more processors and memory. In some embodiments, client device is a mobile phone, a tablet computer, a personal computer or the like.

Attention is directed to FIG. 2.

As shown in FIG. 2, Steps 201-203 describe a client-side method of processing client environment data in accordance with some embodiments. In some embodiments, the method of processing client environment data includes: obtaining predetermined collection parameters; collecting client environment data according to the predetermined collection parameters; and reporting the collected client environment to a server system for analysis at the server system.

The client device obtains (201) predetermined collection parameters. In some embodiments, the predetermined collection parameters are preprogrammed in software or obtained (e.g., received or retrieved) from a server system. In some embodiments, the predetermined collection parameters indicate a collection range and a collection time point of client environment data.

The collection range and the collection time point may be set according to characteristics of the application. Optionally, the method further includes: setting the predetermined collection parameters, where the predetermined collection parameters indicate a collection range and a collection time point for collection of client environment data The client device collects (202) client environment data according to the predetermined collection parameters. In some embodiments, the environment client environment data is collected at the collection time point according to the collection range indicated in the obtained predetermined collection parameters.

For example, if the collection range is "erroneous data generated during operation of application A", and the collection time point is "2011-10-10 10:00", specifically "erroneous data generated during operation of application A" may be collected at "2011-10-10 10:00".

The type of the client environment data is determined according to the characteristics of the application. For example, data is collected when a user starts an application (e.g., a game or other application), when a user exits the application, when an error occurs during operation of the application, when data favorable to product analysis is generated during operation of the application, and the like.

The client device reports (203) the collected client environment data to a server system for analysis at the server system. For a method by which the server-side environment analyzes the client environment data, reference may be made to Embodiment 1.

As can be seen from the above, in this embodiment, client environment data is automatically collected and reported according to predetermined collection parameters, so that a server-side environment can analyze the client environment data to obtain an analysis result. Since the client environment data is automatically collected, and subsequent analysis of the client environment data is performed by a server-side environment, this solution, compared with the prior art which relies on manual user input for collection and manual analysis, achieves real-time collection of client environment data. This solution also greatly improves the reliability of the collected client environment data and, in turn, the accuracy of the analysis result. In addition, since the client environment data does not need to be input and reported by the user, disturbance to the user can be reduced, thereby improving user experience.

As also described above, in addition to reporting client environment data in accordance with predetermined collection parameters, in some embodiments, a client device also respond to the server's real-time command for machine environment data collection. For example, if a particular client device itself does not experience any issues or have any reasons to submit its machine environment data at a particular time, but the particular client device meets the characteristic criteria for identifying potential target clients determined by the server for an issue involving another client device, the particular client device may still get the real-time data collection command and respond by submitting the requested environment data to the server.

Embodiment 3

The methods described in Embodiments 1 and 2 are described in further detail below.

Figure 3A:
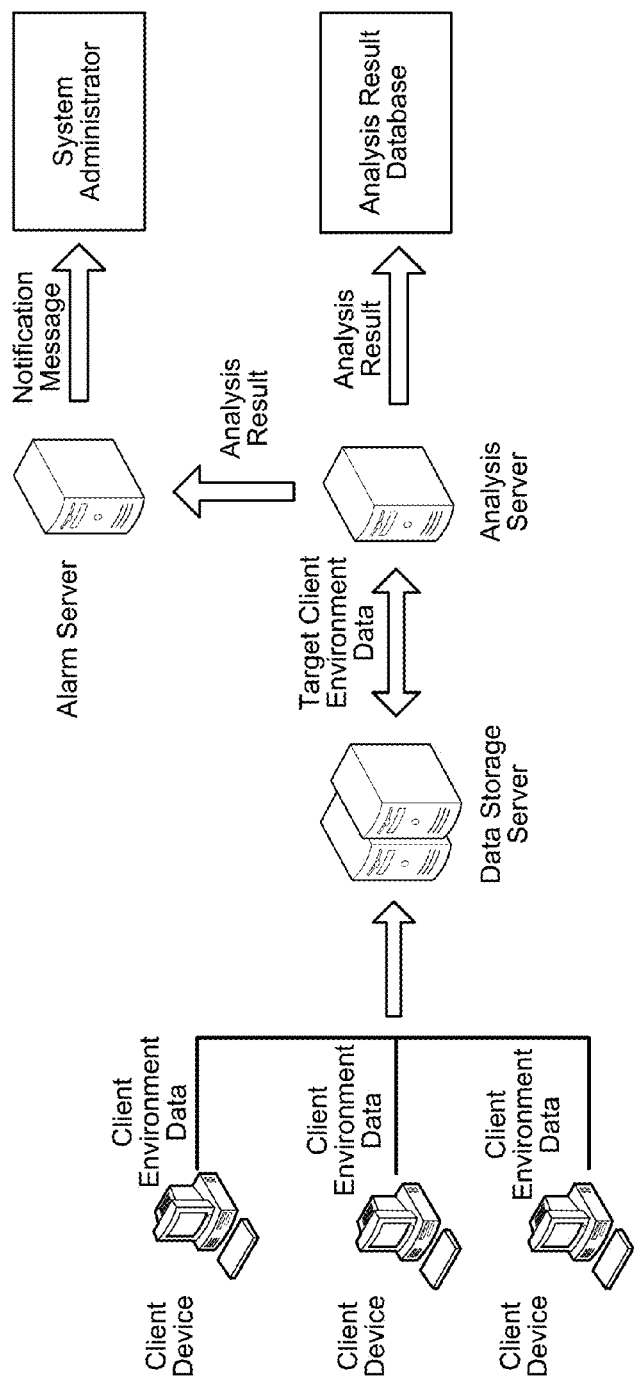
FIG. 3A is a block diagram of a server-client environment in accordance with some embodiments.

FIG. 3A is a block diagram of a server-client environment of this embodiment. This embodiment will be described through an example where client-side processing of client environment data is performed by a client device and server-side processing of client environment data is performed in a server-side environment including a data storage server, an analysis server, and an alarm server. In some embodiments, a single server system is configured to perform server-side processing of client environment data, and the single server system performs the functions of the data storage server, analysis server, and alarm server.

Figure 3B:
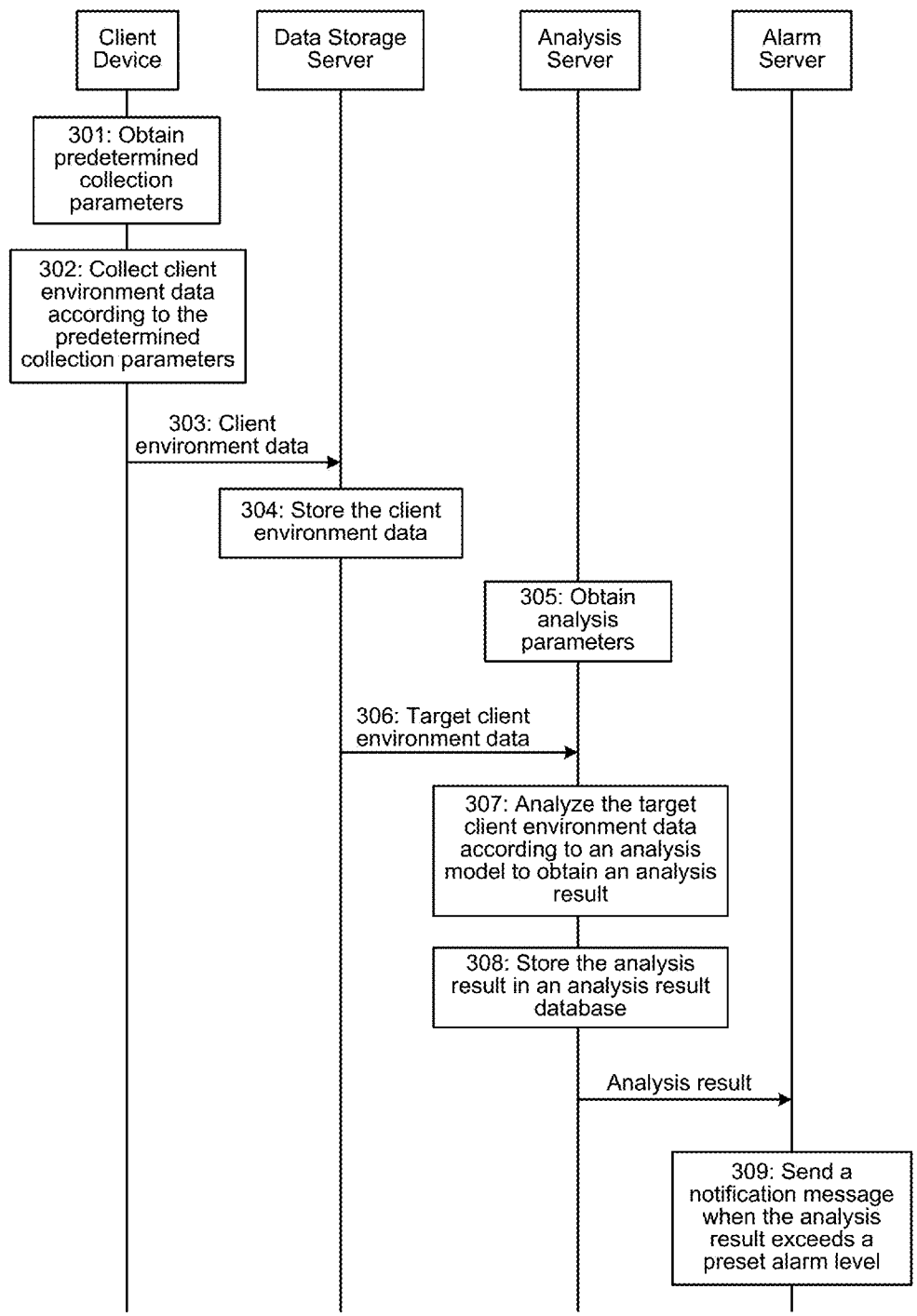
FIG. 3B is a flowchart of a method of processing client environment data in accordance with some embodiments.

FIG. 3B is a flowchart diagram showing a method of processing client environment data in the server-client environment illustrated in FIG. 3A. In some embodiments, the method includes Steps 301-309.

Attention is directed to FIG. 3B.

The client device obtains (301) predetermined collection parameters. In some embodiments, the predetermined collection parameters indicate a collection range and a collection time point for client environment data. For example, the collection range and the collection time point may be set according to characteristics of the application.

The client device collects (302) client environment data according to the predetermined collection parameters. For example, the client device collects the client environment data at the collection time point according to the collection range.

The client device reports (303) the collected client environment data to the data storage server.

The data storage server stores (304) the received client environment data. In some embodiments, when the client environment data is stored, a receiving time of each piece of client environment data is recorded. In addition, in some embodiments, an IP address of the client device reporting the client environment data, data volume of the client environment data, and the like is also recorded.

In some embodiments, the received client environment data may be stored in the form of files at a certain interval granularity. For example, referring to FIG. 3C, the stored client environment data may be expressed as: "bill-2012-04-16-00.dat 16-Apr-2012 00:59 4.1M", "bill-2012-04-16-01.dat 16-Apr-2012 01:59 2.4M", "bill-2012-04-16-02.dat 16-Apr-2012 02:59 1.6M" and so on. In this example, "bill-2012-04-16-00.dat", "bill-2012-04-16-01.dat" and "bill-2012-04-16-02.dat" are file names; "16-Apr-2012 00:59", "16-Apr-2012 01:59" and "16-Apr-2012 02:59" are storage times; and "4.1M", "2.4M" and "1.6M" are the sizes of the data files. Other data files formats or schema may be deduced by analogy from FIG. 3C.

The analysis server obtains (305) analysis parameters. In some embodiments, the analysis server obtains analysis parameters from a system administrator periodically or only when analysis is requested. The analysis parameters may include information such as a time range and an analysis model. The time range refers to a receiving time range of the client environment data to be analyzed. For example, if the time range is "2011-10-10 to 2011-11-10", the analysis server will obtain and analyze client environment data of which the receiving time is "2011-10-10 to 2011-11-10". The analysis model is a corresponding mathematical model established according to different application characteristics and analysis requirements.

In some embodiments, the analysis parameters also include other analysis configuration information. For example, the analysis configuration information is an IP range of client devices whose corresponding client environment data is to be analyzed. In this example, if the IP range is "101.1.1.0 to 101.1.1.1", the analysis server will obtain and analyze client environment data reported by client devices whose IP range is "101.1.1.0 to 101.1.1.1".

The analysis server obtains (306) target client environment data from the stored client environment data according to the analysis parameters obtained in Step 305.

For example, the analysis server obtains, from the client environment data stored at the data storage server, client environment data for which the receiving time is within the time range indicated in the analysis parameters as the target client environment data. In this example, the analysis server generates a uniform resource locator (URL) of a data file according to the time range, and then downloads client environment data stored at the data storage server according to the URL of the data file as the target client environment data.

In another example, the analysis server obtains, from the client environment data stored at the data storage server, client environment data that corresponds to client devices within an IP address range indicated in the analysis parameters as the target client environment data. In this example, the analysis server generates a URL of a data file according to the IP address range, and then downloads client environment data stored at the data storage server according to the URL of the data file as the target client environment data.

The analysis server analyzes (307) the target client environment data according to an analysis model in the obtained analysis parameters to obtain an analysis result. For example, the target client environment data is classified and statistically analyzed according to the analysis model to obtain the analysis result. For example, the analysis result indicates: the number of starts, the number of failed upgrades, the number of successful upgrades, an upgrade failure rate, an upgrade success rate, the number of cancelled upgrades, the number of successful logins, the number of crashes, and/or an average download time, and other information of the application.

The analysis server stores (308) the analysis result in an analysis result database for future query or analysis. The structure of the analysis result database may be set according to characteristics of the application. The analysis result database is typically configured to store analysis results and information related to client environment data on which the analysis results were based, such as IP address(es) of client devices and/or receiving time(s) of the client environment data. In some embodiments, the analysis result database is stored in the server-side environment (e.g., at any one of the data storage server, the analysis server, or the alarm server), or, alternatively, the analysis result database is stored in a server or database remote from the server-side environment.

Optionally, the alarm server obtains (309) the analysis result and, in accordance with a determination that the analysis result exceeds a preset alarm level, sends a notification of the analysis result to relevant personnel (e.g., a system administrator of the server-side environment). The notification is sent using one or more communication types such as email, short message, multimedia message, micro message, or the like. The notification message includes one or more types of media such as text, voice, image, etc.

After being classified and statistically analyzed, the analysis result of the client environment data may be applied to various aspects of the application. For example, the analysis result is used to analyze user behavior when using the application, to observe the quality of the application, or to generate a notification in the case of issues or defects with the application.

FIG. 3D shows a user interface for analyzing client environment data. In FIG. 3D, the exemplary data table is used to analyze client environment data corresponding to an application. For example, the user interface includes tabs for displaying statistics based on the client environment data, including: the number of starts, the number of failed upgrades, the number of successful upgrades, an upgrade failure rate, an upgrade success rate, the number of cancelled upgrades, the number of successful logins, the number of crashes, and/or an average download time, and other information.

Figure 3E:
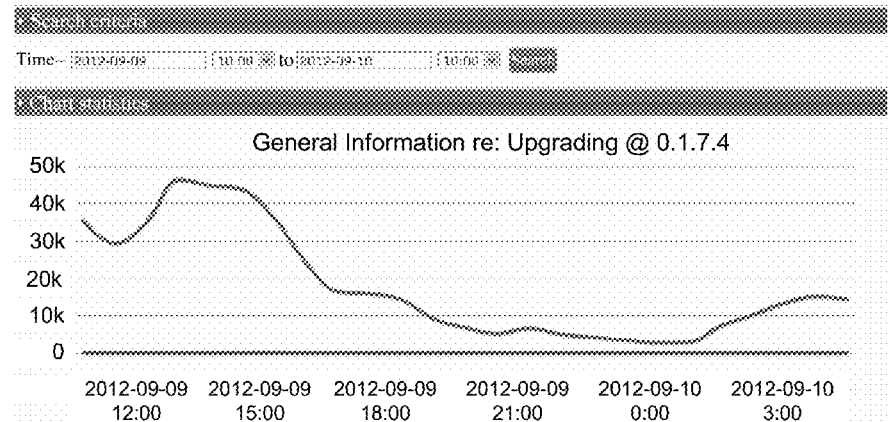
FIGS. 3E-3G illustrate graphical representations of client environment data in accordance with some embodiments.
Figure 3F:
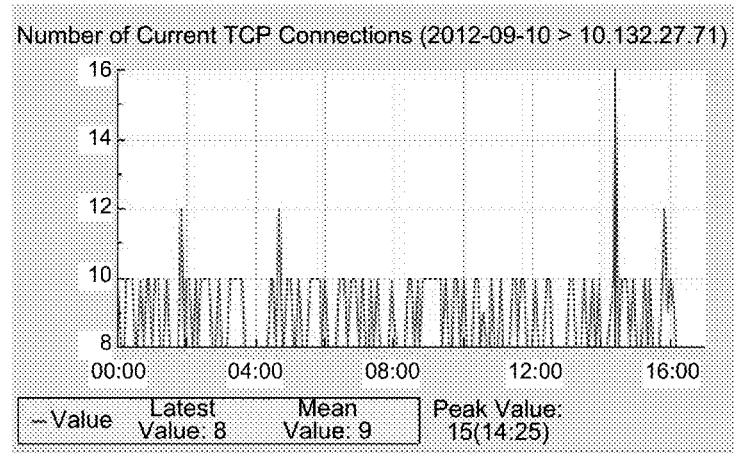
Figure 3G:
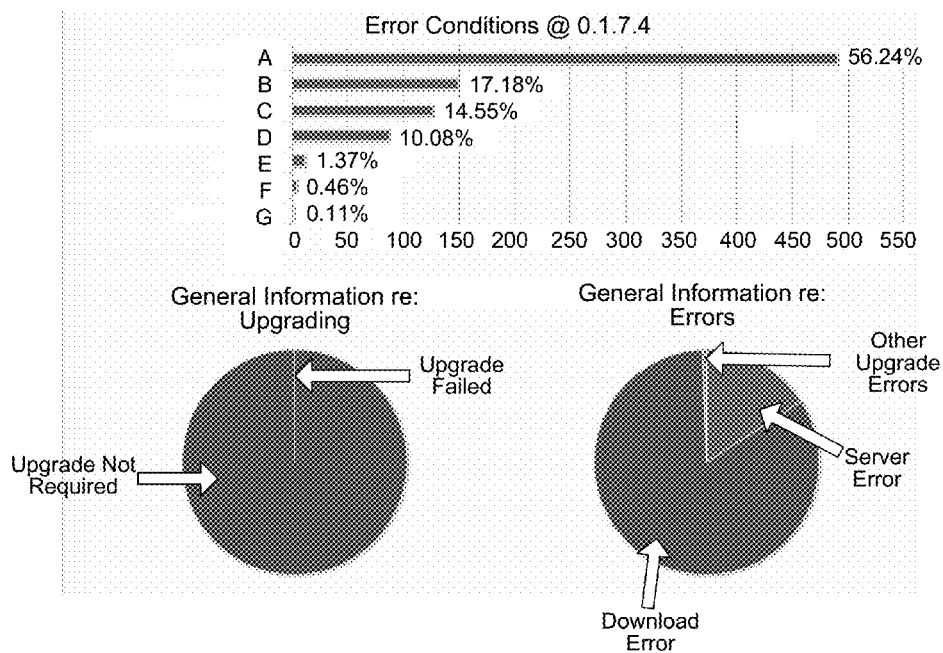

FIGS. 3E-3G are exemplary graphical representations of client environment data corresponding to an application. FIG. 3E illustrates a line graph of general information about a total number of client devices upgrading by time. FIG. 3F illustrates a graph of transmission control protocol (TCP) connections by time. For example, the server system generates a notification when the number of TCP connections exceeds a threshold amount. FIG. 3G illustrates a bar graph and pie charts for error conditions of the application. For example, the error conditions include failure to connect to a version server, closing of a link by the version server, insufficient disk space during downloading, illegal client version during connection to version server, invalid product ID (e.g., serial number or digital rights management (DRM) license). In FIG. 3G, the bar graph shows a total number of each particular error and a percentage of each particular error relative to the total number of errors. In FIG. 3G, the pie charts show general information about upgrading and general information about errors.

Figure 3H:
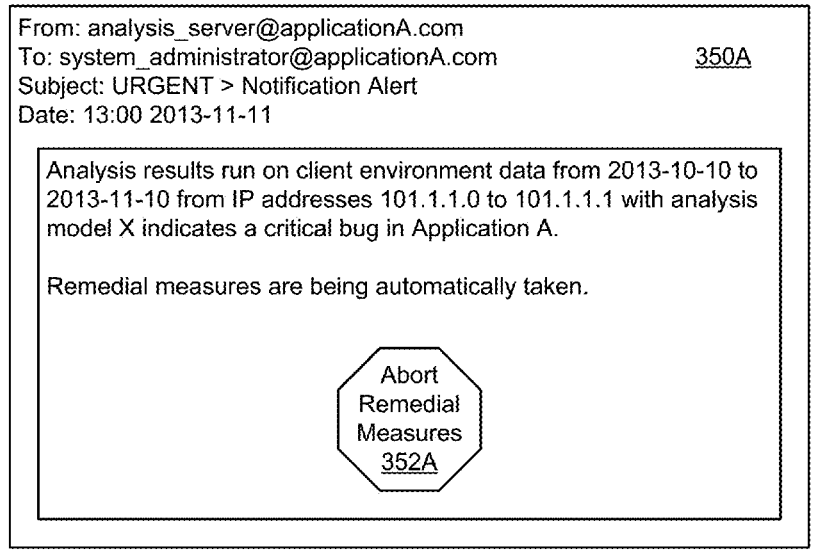
FIGS. 3H-3J illustrate visual representations of notifications in accordance with some embodiments.
Figure 3I:
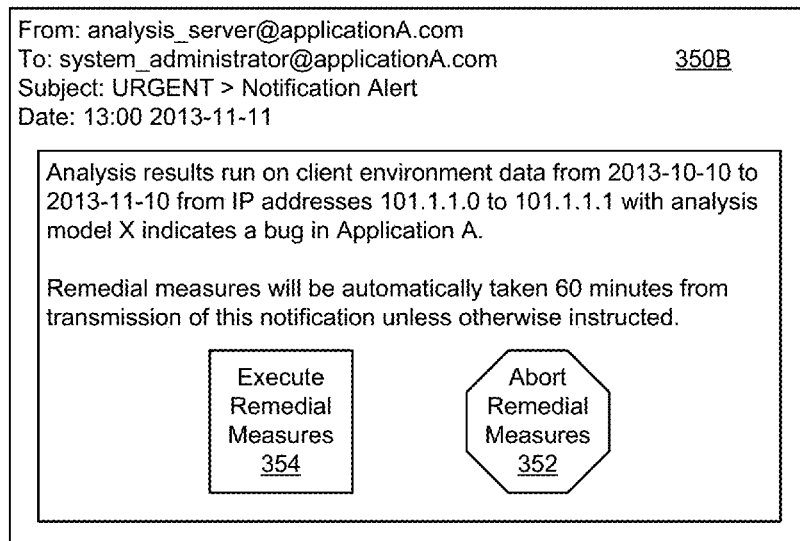
Figure 3J:
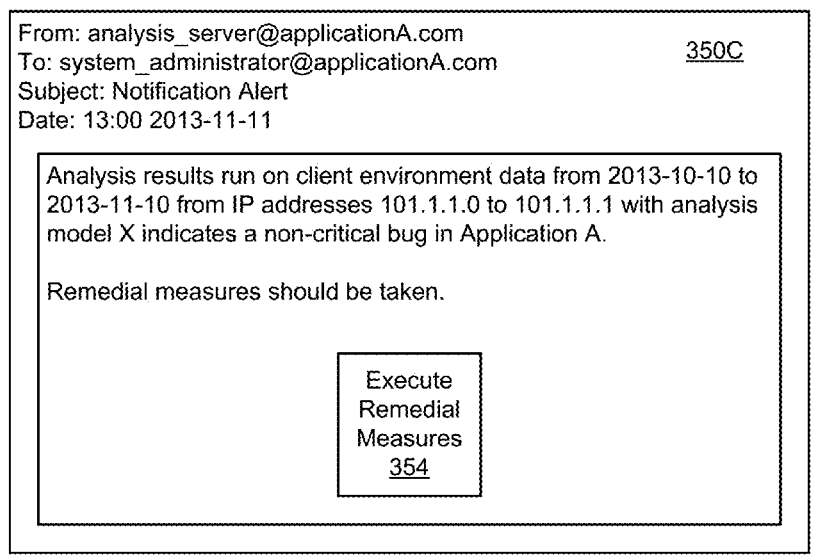

FIG. 3H-3J illustrate visual representations of notifications (e.g., 350A, 350B, 350C) received by the system administrator from the server system in accordance with some embodiments. In some embodiments, the server system or a component thereof (e.g., the alarm server or notification module) sends a notification (e.g., an alert or alarm message) when it is determined that the analysis result exceeds a predetermined alarm level. In FIG. 3H-3J, the notification indicates a that bug has been identified in Application A (e.g., associated with the system administrator/developer) based on the analysis results from running analysis model X on client environment data received between 2013-10-10 to 2013-11-10 and received from IP addresses 101.1.1.0 to 101.1.1.1. In FIG. 3H-3J, the notification received by the system administrator is an email and the notification varies based on the magnitude by which the analysis result exceeds the predetermined alarm level and/or the type of remedial measures that are being taken or recommended.

In FIG. 3H, the email notification 350A indicates that the server system is automatically undertaking remedial measures to solve the problem (e.g., a critical bug in Application A) identified based on the analysis results. In FIG. 3H, the email notification 350A also includes an option (e.g., an abort button 352) to abort the remedial measures which when selected by the system administrator sends a command to the server system to abort current remedial measures.

In FIG. 3I, the email notification 350B indicates that the server system will automatically take remedial measures to solve the problem (e.g., a bug in Application A) identified based on the analysis results sixty minutes from transmission of the email unless otherwise instructed. In FIG. 3H, the email notification 350B also includes an option (e.g., an abort button 352) to abort the remedial measures which when selected by the system administrator sends a command to the server system to abort current remedial measures and stop the sixty minute countdown. In FIG. 3H, the email notification 350B also includes an option (e.g., an execution button 354) to immediately execute the remedial measures and stop the sixty minute countdown.

In FIG. 3J, the email notification 350C indicates that the server system suggests that remedial measures should be taken to solve the problem (e.g., a non-critical bug in Application A) identified based on the analysis results. In FIG. 3J, the email indicates that the remedial measures will not be taken by the server system unless instructed by the system administrator to do so. In FIG. 3J, the email also includes an option (e.g., an execution button 354) to immediately execute the remedial measures.

As can be seen from the above, in this embodiment, client environment data is automatically collected and reported according to predetermined collection parameters, so that a server-side environment can analyze the client environment data to obtain an analysis result. Since the client environment data is automatically collected, and subsequent analysis of the client environment data is performed by a server-side environment, this solution, compared with the prior art which relies on manual user input for collection and manual analysis, achieves real-time collection of client environment data. This solution also greatly improves the reliability of the collected client environment data and, in turn, the accuracy of the analysis result. In addition, since the client environment data does not need to be input and reported by the user, disturbance to the user can be reduced, thereby improving user experience.

Further, the analysis result may be stored in an analysis result database to facilitate future queries or analysis by relevant personnel, so as to better maintain and improve the application. Moreover, the alarm server obtains the analysis result, and when determining that the analysis result exceeds a preset alarm level, send a notification (e.g., an alarm message) to alert relevant personnel (e.g., a system administrator) of a defect or problem in order to maintain and improve the application before further such defects or problems occur.

Embodiment 4

Figure 4:
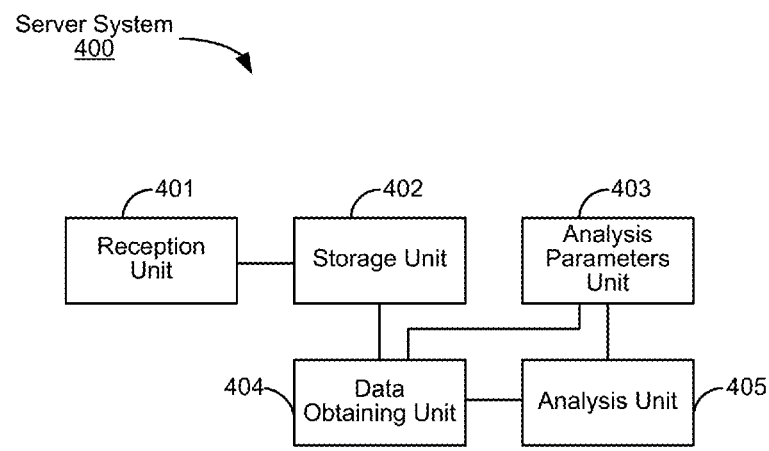
FIG. 4 is a schematic diagram of a server system in accordance with some embodiments.

To better implement the above methods, an embodiment of the invention further provides server-side processing of client environment data in a server-side environment. The server-side environment at least includes a server system and optionally includes two or more servers (e.g., data storage server, analysis server, and alarm server). As shown in FIG. 4, server system 400 includes: reception unit 401; storage unit 402; analysis parameters unit 403; data obtaining unit 404; and analysis unit 405.

Reception unit 401 is configured to receive client environment data reported by a client device. The client environment data is provided by the client device according to predetermined collection parameters.

Storage unit 402 is configured to store client environment data received by the receiving unit 401. In addition, storage unit 402 may be further configured to record, when storing the received client environment data, an IP address of the client device reporting the client environment data and a time at which the client environment data was reported, and the like.

Analysis parameters unit 403 is configured to obtain analysis parameters. In some embodiments, analysis parameters unit 403 obtains analysis parameters only when client environment data needs to be analyzed or periodically according to a predetermined period. In some embodiments, the analysis parameters include a time range and/or a range of client devices (e.g., IP address range) on which to run a specified diagnostic or analysis model. In some embodiments, analysis parameters are obtained from a system administrator of the server-side environment.

Data obtaining unit 404 is configured to obtain target client environment data from the stored client environment data according to the analysis parameters s (e.g., including a time range, a range of client devices) obtained by analysis parameters unit 403.

Analysis unit 405 is configured to analyze the target client environment data obtained by data obtaining unit 404 according to the analysis parameters (e.g., including a specified diagnostic or analysis model) to generate an analysis result. In addition, analysis unit 405 may be specifically configured to classify and statistically analyze the target client environment data according to a specified diagnostic or analysis model. For example, the analysis model is run to obtain: the number of starts, the number of failed upgrades, the number of successful upgrades, an upgrade failure rate, an upgrade success rate, the number of cancelled upgrades, the number of successful logins, the number of crashes and/or an average download time, and other information of the application that corresponds to the target client environment data.

Optionally, in some embodiments, analysis unit 405 or a sub-unit thereof (e.g., a notification unit) is also configured determine whether the analysis result exceeds a preset alarm level, and, in accordance with a determination that the analysis result exceeds the preset alarm level, send a notification (e.g., an alarm message) to alert relevant personnel (e.g., a system administrator) of a defect or problem in order to maintain and improve the application before further such defects or problems occur. The alarm level may be set according to the characteristics of the application.

An archival unit is configured to store the analysis result in an analysis result database for future query and analysis. The structure of the analysis result database may be set according to the characteristics of the application. The analysis result database is mainly configured to store an analysis result of client environment data and information related to the client environment data, such as the IP address of the corresponding client device reporting the client environment data and/or the receiving time corresponding to the client environment data.

In specific implementations, the above units may be implemented as separate entities, or may be combined in any way and implemented as one or several entities. For the specific implementation of the above units, reference may be made to the above embodiments, and the details will not be described herein again.

As can be seen from the above, in this embodiment, client environment data is automatically collected and reported according to predetermined collection parameters, so that server system 400 can analyze the client environment data to obtain an analysis result. Since the client environment data is automatically collected, and subsequent analysis of the client environment data is performed by server system 400, this solution, compared with the prior art which relies on manual user input for collection and manual analysis, achieves real-time collection of client environment data. This solution also greatly improves the reliability of the collected client environment data and, in turn, the accuracy of the analysis result. In addition, since the client environment data does not need to be input and reported by the user, disturbance to the user can be reduced, thereby improving user experience.

Embodiment 5

Figure 5:
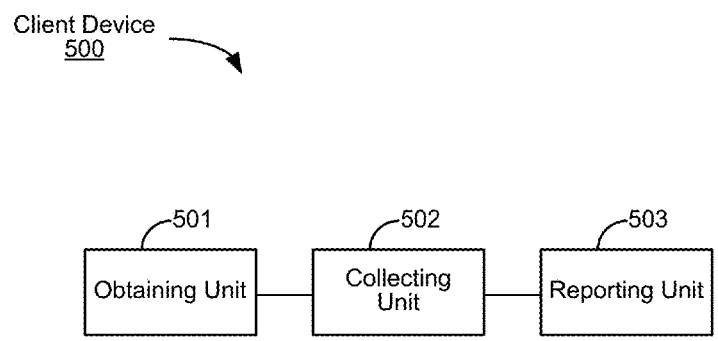
FIG. 5 is a schematic diagram of a client device in accordance with some embodiments.

Correspondingly, an embodiment of the invention further provides client-side processing of client environment data at a client device. As shown in FIG. 5, client device 500 includes: obtaining unit 501; collecting unit 502; and reporting unit 503.

Obtaining unit 501 is configured to obtain predetermined collection parameters. For example, the predetermined collection parameters indicate a collection range and a collection time point of client environment data.

Collecting unit 502 is configured to collect client environment data according to the predetermined collection parameters. For example, client environment data is collected at the collection time point according to the collection range indicated by the predetermined collection parameters.

For example, if the collection range is "erroneous data generated during operation of application A", and the collection time point is "2011-10-10 10:00", specifically "erroneous data generated during operation of application A" may be collected at "2011-10-10 10:00".

The type of the client environment data is determined according to the characteristics of the application. For example, data is collected when a user starts an application (e.g., a game or other application), when a user exits the application, when an error occurs during operation of the application, when data favorable to product analysis is generated during operation of the application, and the like.

Reporting unit 503 is configured to report the collected client environment data to a server system for analysis by the server system. For a specific method by which the server system analyzes the client environment data, reference may be made to the above embodiments and the details will not be described herein again.

The collection range and the collection time point may be set according to the characteristics of the application. Optionally, in some embodiment, the client device for also includes a setting unit. The setting unit is configured to receive predetermined collection parameters and set the predetermined collection parameters. For example, the predetermined collection parameters indicate the collection range and the collection time point of the client environment data.

In specific implementations, the above units may be implemented as separate entities, or may be combined in any way and implemented as one or several entities. For the specific implementation of the above units, reference may be made to the above embodiments, and the details will not be described herein again.

As can be seen from the above, client environment data may be automatically collected by collection unit 502 according to the predetermined collection parameters, and reported by reporting unit 503. Since the client environment data is automatically collected, and subsequent analysis of the client environment data is performed by a server-side environment, this solution, compared with the prior art which relies on manual user input for collection and manual analysis, achieves real-time collection of client environment data. This solution also greatly improves the reliability of the collected client environment data and, in turn, the accuracy of the analysis result. In addition, since the client environment data does not need to be input and reported by the user, disturbance to the user can be reduced, thereby improving user experience.

Embodiment 6

Correspondingly, an embodiment of the invention provides a server-client environment, including a server-side environment (or a server system) for server-side processing of client environment data and a client device for client-side processing of client environment data. For the server-side environment (or a server system), refer to Embodiment 4 and, for the client device, refer to Embodiment 5.

The client device is configured to obtain collection predetermined collection parameters and reports the collected client environment data to the server-side environment. In some embodiments, the predetermined collection parameters indicate a collection range and a collection time point. For example, the client device collects client environment data at the collection time point according to the collection range.

The server-side environment is configured to receive client environment data from the client device, store the received client environment data, obtain analysis parameters, obtain target client environment data from the stored client environment data according to the obtained analysis parameters, and analyze the target client environment data according to the obtained analysis parameters to obtain an analysis result.

For specific implementations, reference may be made to the above embodiments, and the details will not be described herein again.

As can be seen from the above, in this embodiment, client environment data is automatically collected and reported according to predetermined collection parameters, so that a server-side environment can analyze the client environment data to obtain an analysis result. Since the client environment data is automatically collected, and subsequent analysis of the client environment data is performed by a server-side environment, this solution, compared with the prior art which relies on manual user input for collection and manual analysis, achieves real-time collection of client environment data. This solution also greatly improves the reliability of the collected client environment data and, in turn, the accuracy of the analysis result. In addition, since the client environment data does not need to be input and reported by the user, disturbance to the user can be reduced, thereby improving user experience.

Further, the analysis result may be stored in an analysis result database to facilitate future queries or analysis by relevant personnel, so as to better maintain and improve the application. Moreover, the alarm server obtains the analysis result, and when determining that the analysis result exceeds a preset alarm level, send a notification (e.g., an alarm message) to alert relevant personnel (e.g., a system administrator) of a defect or problem in order to maintain and improve the application before further such defects or problems occur.

Server-Client Environment

Figure 6:
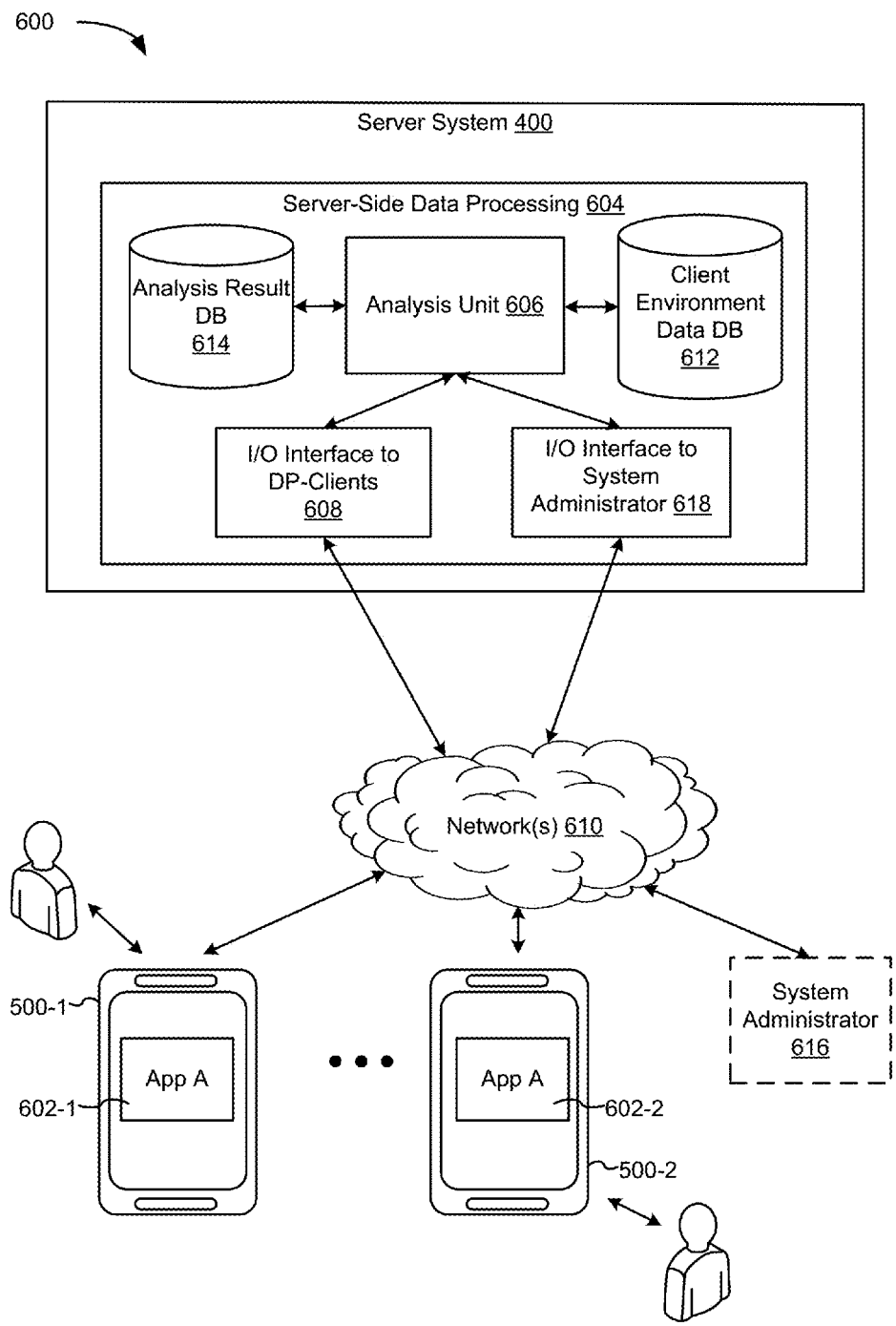
FIG. 6 is a block diagram of a server-client environment in accordance with some embodiments.

As shown in FIG. 6, in some embodiments, client environment data processing is implemented in a server-client environment 600. Client environment data processing includes a client-side portion 602-1, 602-2 (hereinafter "DP-client 602") executed on a client device 500-1, 500-2 and a server-side portion 604 (hereinafter "DP-server 604") executed on a server system 400. DP-client 602 communicates with DP-server 604 through one or more networks 610. DP-client 602 provides client-side functionalities such as client-facing input and output processing and communications with DP-server 604. DP-server 604 provides server-side functionalities for any number of DP-clients 602 each residing on a respective client device 500.

In some embodiments, DP-server 604 includes an I/O interface to DP-clients 608, analysis module 606, client environment data database 612, analysis result database 614, and an I/O interface to a system administrator 618. I/O interface to DP-clients 608 facilitates the client-facing input and output processing for DP-server 604. Analysis module 904 analyzes client environment data received from DP-clients 604 according to analysis parameters obtained from system administrator 616. Client environment data database 612 stores client environment data received from DP-clients 604 and analysis result database 614 stores analysis results for future query and analysis. In some embodiments, DP-server 604 communicates with a system administrator 616 (e.g., the developer of an application) through one or more networks 610 for obtaining analysis parameters and sending analysis results. I/O interface to system administrator 618 facilitates such communications.

Examples of client device 500 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 610 include local area networks ("LAN") and wide area networks ("WAN") such as the Internet. Communication network(s) 1010 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi Fi, voice over Internet Protocol (VoIP), Wi-MAX, or any other suitable communication protocol.

Server system 400 is implemented on one or more standalone data processing apparatuses or a distributed network of computers. In some embodiments, server system 100 also employs various virtual devices and/or services of third party service providers (e.g., third-party cloud service providers) to provide the underlying computing resources and/or infrastructure resources of server system 400.

Although server-client environment 600 shown in FIG. 6 includes both a client-side portion (e.g., DP-client 602) and a server-side portion (e.g., DP-server 604), in some embodiments, client environment data processing is implemented as a standalone application installed on user device 500. In addition, the division of functionalities between the client and server portions of client environment data processing can vary in different embodiments. For example, in some embodiments, DP-client 602 is a thin-client that provides only user-facing input and output processing functions, and delegates all other audio information query functionalities to a backend server (e.g., server system 400).

Figure 7:
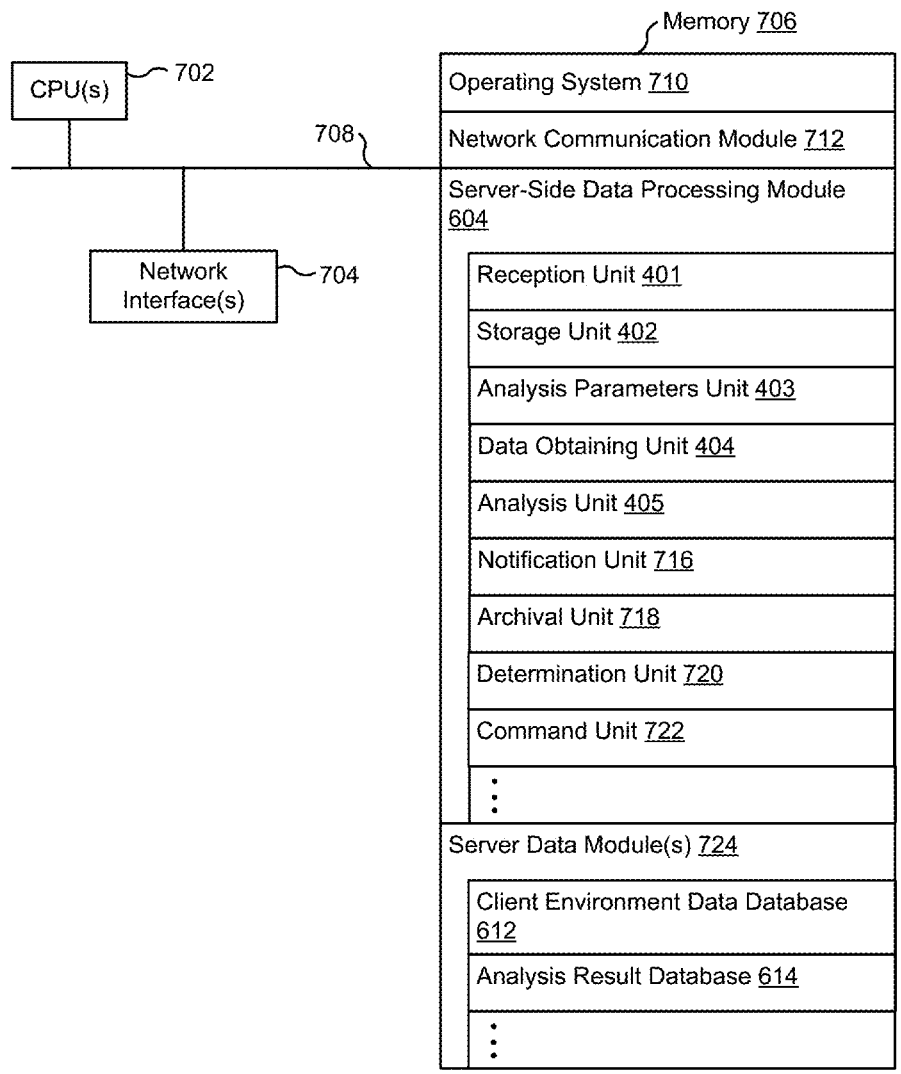
FIG. 7 is a block diagram of a server system in accordance with some embodiments.

FIG. 7 is a block diagram illustrating server system 400 in accordance with some embodiments. Server system 400, typically, includes one or more processing units (CPUs) 702, one or more network interfaces 704, memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 706, optionally, includes one or more storage devices remotely located from the CPU(s) 702. Memory 706, or alternately the non-volatile memory device(s) within memory 706, includes a non-transitory computer readable storage medium. In some implementations, memory 706, or the non-transitory computer readable storage medium of memory 706, stores the following programs, modules, and data structures, or a subset or superset hereof:

- an operating system 710 including procedures for handling various basic system services and for performing hardware dependent tasks;
- a network communication module 712 that is used for connecting server system 400 to other computing devices (e.g., client devices 500) connected to one or more networks 610 via one or more network interfaces 704 (wired or wireless);
- a server-side data processing module 604 for enabling server system 400 to perform client environment data processing, including but not limited to:
    - a reception unit 401 for receiving client environment data reported by a client device 500;
    - a storage unit 402 for storing received client environment data in client environment data database 612;
    - an analysis parameters unit 403 for obtaining analysis parameters;
    - a data obtaining unit 404 for obtaining target client environment data from the stored client environment data according to the analysis parameters;
    - an analysis unit 405 for analyzing the target client environment data to generate and analysis result;
    - a notification unit 716 for determining whether the analysis result exceeds a preset alarm level and, in accordance with a determination that the analysis result exceeds the preset alarm level, sending a notification;
    - an archival unit 718 for storing analysis results in analysis result database 614;
    - a determination unit 720 for determining characteristic criteria for identifying potential target clients for additional data collection; and a command unit 722 for sending data collections commands to client devices 500; and one or more server data modules 724 for storing data related to server system 400, including but not limited to:

a client environment data database 612 for storing client environment data received from client devices 500 for analysis; and an analysis results database 614 for storing analysis results for future query and analysis.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
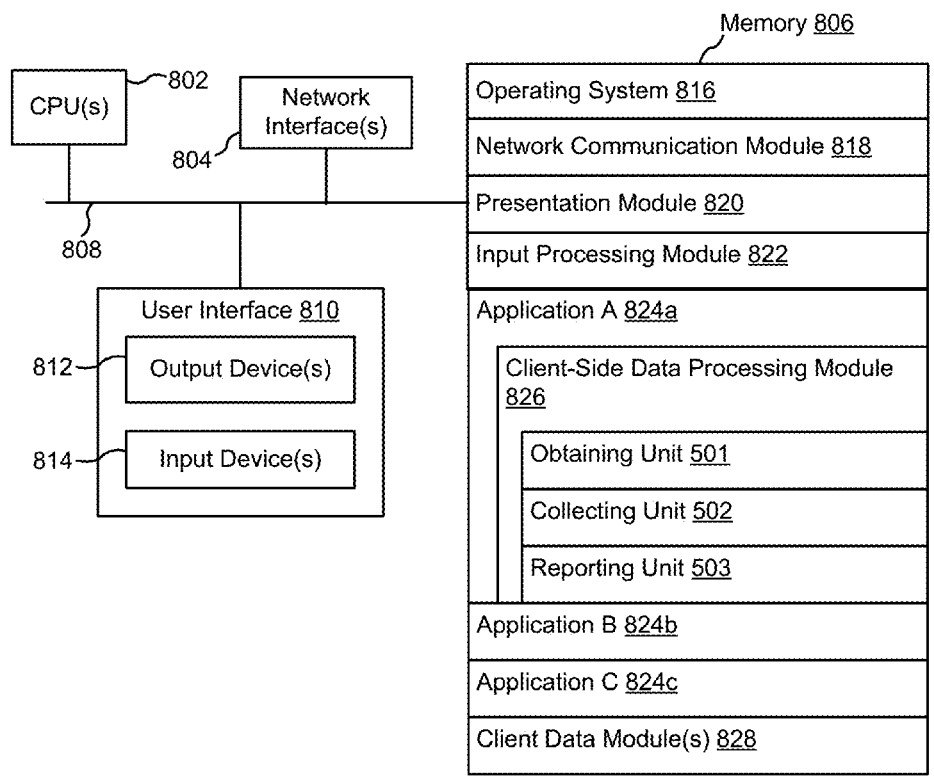
FIG. 8 is a block diagram of a client device in accordance with some embodiments.

FIG. 8 is a block diagram illustrating a representative client device 500 associated with a user in accordance with some embodiments. Client device 500, typically, includes one or more processing units (CPUs) 802, one or more network interfaces 804, memory 806, and one or more communication buses 808 for interconnecting these components (sometimes called a chipset). Client device 500 also includes a user interface 810. User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some client devices 500 use a microphone and voice recognition or a camera and gesture recognition to supplement or replace the keyboard. Memory 806 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 806, optionally, includes one or more storage devices remotely located from CPU(s) 802. Memory 806, or alternately the non-volatile memory device(s) within memory 806, includes a non-transitory computer readable storage medium. In some implementations, memory 806, or the non-transitory computer readable storage medium of memory 806, stores the following programs, modules, and data structures, or a subset or superset thereof:

an operating system 816 including procedures for handling various basic system services and for performing hardware dependent tasks;

a network communication module 818 for connecting user device 500 to other computers (e.g., server system 400) connected to one or more networks 610 via one or more communication network interfaces 804 (wired or wireless);

a presentation module 820 for enabling presentation of information (e.g., a user interface for a web page or an application program, audio and/or video content, text, etc.) at client device 500 via one or more output devices 812 (e.g., displays, speakers, etc.) associated with user interface 810;

an input processing module 822 for detecting one or more user inputs or interactions from one of the one or more input devices 814 and interpreting the detected input or interaction; and a plurality of application modules 824 (e.g., application A 824*a*, application B 824*b*, application C 824*c*, etc.), where representative application A 824*c* includes:

a client-side data processing module 826 for processing client environment data, including but not limited to:

an obtaining module 501 for obtaining predetermined collection parameters;

a collecting module 502 for collecting client environment data according to the predetermined collection parameters; and a reporting module 503 for reporting the collected client environment data to server system 400 for analysis; and one or more client data modules 828 for storing data related to client device 500.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1106, optionally, stores a subset of the modules and data structures identified above. Furthermore, memory 1106, optionally, stores additional modules and data structures not described above.

Although FIGS. 7-8 shows server system 400 and client device 500, respectively, FIGS. 7-8 are intended more as functional description of the various features which may be present in a set of servers than as a structural schematic of the implementations described herein. In practice, and as recognized by those of ordinary skill in the art, items shown separately could be combined and some items could be separated. For example, some items shown separately in FIGS. 7-8 could be implemented on a single server and single items could be implemented by one or more servers. For example, the actual number of servers used to implement server system 400 and how features are allocated among them will vary from one implementation to another.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a server system with one or more processors and memory:
receiving respective client environment data from a first client device of a plurality of client devices, wherein the respective client environment data include data associated with machine status at the first client device when a user at the first client device acts on a first software application installed on the first client device, wherein the respective client environment data is provided to the server system according to predetermined collection parameters that specify one or more trigger events for collection of the respective client environment data at the first client device;
based on the respective client environment data received from the first client device:
identifying a first potential issue associated with the first application that has occurred at the first client device; and
determining characteristic criteria for identifying potential target client devices for additional data collection to investigate the first potential issue associated with the first application, wherein the characteristic criteria include one or more characteristics of the first client device that are relevant to the first potential issue;
sending a data collection command to at least one second client device of the plurality of client devices in accordance with the characteristic criteria, wherein the at least one second client device and the first client device share the one or more characteristics of the first client device;
receiving additional client environment data from the at least one second client device, wherein the additional client environment data is provided to the server system in response to the data collection command received at the at least one second client device;
ascertaining existence of the first potential issue associated with the first application at the first client device and the at least one second client device based on the client environment data received from the first client device and the additional client environment data received from the at least one second client device; and
in response to ascertaining the existence of the first potential issue, dispatching one or more remedial actions to the first client device and the at least one second client device.

2. The method of claim 1, further comprising:
analyzing the respective client environment data received from the first client device to generate an analysis result.

3. The method of claim 2, further comprising:
generating one or more suggestions for further data collection or remedial measures based on the analysis result.

4. The method of claim 2, further comprising:
generating one or more predictions regarding the plurality of client devices based on the analysis result.

5. The method of claim 2, further comprising:
modifying the predetermined collection parameters based on the analysis result.

6. The method of claim 2, further comprising:
sending a notification when the analysis results meets predetermined criteria.

7. The method of claim 1, further comprising:
identifying the at least one second client device of the plurality of client devices based on the characteristic criteria.

8. The method of claim 1, further comprising:
in response to sending the data collection command, receiving respective client environment data from the at least one second client device of the plurality of client devices, wherein the respective client environment data from the at least one second client device is provided according to the data collection command; and
analyzing the respective client environment data from the first client device and the respective client environment data from the at least one second client device to generate an analysis result.

9. A server system, comprising:
one or more processors; and
memory storing one or more programs, the programs including instructions, which, when executed by the one or more processors, cause the one or more processors to perform operations comprising:
receiving respective client environment data from a first client device of a plurality of client devices, wherein the respective client environment data include data associated with machine status at the first client device when a user at the first client device acts on a first software application installed on the first client device, wherein the respective client environment data is provided to the server system according to predetermined collection parameters that specify one or more trigger events for collection of the respective client environment data at the first client device;
based on the respective client environment data received from the first client device:
identifying a first potential issue associated with the first application that has occurred at the first client device; and
determining characteristic criteria for identifying potential target client devices for additional data collection to investigate the first potential issue associated with the first application, wherein the characteristic criteria include one or more characteristics of the first client device that are relevant to the first potential issue;
sending a data collection command to at least one second client device of the plurality of client devices in accordance with the characteristic criteria, wherein the at least one second client device and the first client device share the one or more characteristics of the first client device;
receiving additional client environment data from the at least one second client device, wherein the additional client environment data is provided to the server system in response to the data collection command received at the at least one second client device; and ascertaining existence of the first potential issue associated with the first application at the first client device and the at least one second client device based on the client environment data received from the first client device and the additional client environment data received from the at least one second client device; and in response to ascertaining the existence of the first potential issue, dispatching one or more remedial actions to the first client device and the at least one second client device.

10. The server system of claim 9, wherein the one or more programs further comprise instructions for:

in response to sending the data collection command, receiving respective client environment data from the at least one second client device of the plurality of client devices, wherein the respective client environment data from the at least one second client device is provided according to the data collection command; and analyzing the respective client environment data from the first client device and the respective client environment data from the at least one second client device to generate an analysis result.

11. The server system of claim 10, wherein the one or more programs further comprise instructions for:

generating one or more suggestions for further data collection or remedial measures based on the analysis result.

12. The server system of claim 10, wherein the one or more programs further comprise instructions for:

generating one or more predictions regarding the plurality of client devices based on the analysis result.

13. The server system of claim 10, wherein the one or more programs further comprise instructions for:

modifying the predetermined collection parameters based on the analysis result.

14. The server system of claim 10, wherein the one or more programs further comprise instructions for:

sending a notification when the analysis result meets predetermined criteria.

15. A non-transitory computer readable storage medium storing one or more programs, the one or more programs comprising instructions, which, when executed by a server system device with one or more processors, cause the server system to perform operations comprising:

receiving respective client environment data from a first client device of a plurality of client devices, wherein the respective client environment data include data associated with machine status at the first client device when a user at the first client device acts on a first software application installed on the first client device, wherein the respective client environment data is provided to the server system according to predetermined collection parameters that specify one or more trigger events for collection of the respective client environment data at the first client device;

based on the respective client environment data received from the first client device:

identifying a first potential issue associated with the first application that has occurred at the first client device; and determining characteristic criteria for identifying potential target client devices for additional data collection to investigate the first potential issue associated with the first application, wherein the characteristic criteria include one or more characteristics of the first client device that are relevant to the first potential issue;

sending a data collection command to at least one second client device of the plurality of client devices in accordance with the characteristic criteria, wherein the at least one second client device and the first client device share the one or more characteristics of the first client deice;

receiving additional client environment data from the at least one second client device, wherein the additional client environment data is provided to the server system in response to the data collection command received at the at least one second client device;

ascertaining existence of the first potential issue associated with the first application at the first client device and the at least one second client device based on the client environment data received from the first client device and the additional client environment data received from the at least one second client device; and in response to ascertaining the existence of the first potential issue, dispatching one or more remedial actions to the first client device and the at least one second client device.

16. The non-transitory computer readable storage medium of claim 15, wherein the instructions cause the server system to perform operations further comprising:

in response to sending the data collection command, receiving respective client environment data from the at least one second client device of the plurality of client devices, wherein the respective client environment data from the at least one second client device is provided according to the data collection command; and analyzing the respective client environment data from the first client device and the respective client environment data from the at least one second client device to generate an analysis result.

17. The non-transitory computer readable storage medium of claim 16, wherein the instructions cause the server system to perform operations further comprising:

generating one or more suggestions for further data collection or remedial measures based on the analysis result.

18. The non-transitory computer readable storage medium of claim 16, wherein the instructions cause the server system to perform operations further comprising:

generating one or more predictions regarding the plurality of client devices based on the analysis result.

19. The non-transitory computer readable storage medium of claim 16, wherein the instructions cause the server system to perform operations further comprising:

modifying the predetermined collection parameters based on the analysis result.

20. The non-transitory computer readable storage medium of claim 16, wherein the instructions cause the server system to perform operations further comprising:

sending a notification when the analysis result meets predetermined criteria.

\* \* \* \* \*